(12) United States Patent
Kaneko et al.

(10) Patent No.: US 6,383,678 B1
(45) Date of Patent: May 7, 2002

(54) SEPARATOR FOR FUEL CELL AND A METHOD FOR PRODUCING THE SEPARATOR

(75) Inventors: Michiyo Kaneko, Nishio; Seiji Mizuno, Toyota, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/452,131

(22) Filed: Dec. 1, 1999

(30) Foreign Application Priority Data

Dec. 21, 1998 (JP) .......................... 10-362808
Jul. 29, 1999 (JP) .......................... 11-214738

(51) Int. Cl.$^7$ .......................................... H01M 2/100
(52) U.S. Cl. .............................. 429/34; 429/35; 429/36; 427/115; 428/214
(58) Field of Search .............................. 429/33, 34, 35, 429/36, 30, 38; 428/214, 217, 334, 457; 427/115

(56) References Cited

U.S. PATENT DOCUMENTS

| 4,855,092 A | * | 8/1989 | Fukuda et al. ............. 264/29.5 |
| 5,232,792 A | * | 8/1993 | Reznikov ..................... 429/14 |
| 5,424,144 A | * | 6/1995 | Woods, Jr. ................... 429/35 |
| 5,503,945 A | * | 4/1996 | Petri et al. .................... 429/35 |
| 6,153,326 A | * | 11/2000 | Matsukawa et al. ......... 429/34 |

FOREIGN PATENT DOCUMENTS

| JP | 6342664 | * | 12/1994 | ............ H01M/8/02 |
| JP | A-8-222237 | | 8/1996 | |
| JP | A-9-283157 | | 10/1997 | |
| JP | 2000-67881 | * | 3/2000 | ............ H01M/8/02 |
| JP | 2000-138065 | * | 5/2000 | ............ H01M/8/02 |
| WO | WO-01-28018 | * | 4/2001 | |

* cited by examiner

Primary Examiner—Gabrielle Brouillette
Assistant Examiner—Ray Alejandro
(74) Attorney, Agent, or Firm—Oliff & Berridge, PLC

(57) ABSTRACT

A separator for an electrochemical fuel cell provides a path for a fuel gas or an oxidative gas to an electrode and functions as a wall of a unit cell of the electrochemical fuel cell. The separator comprises a conductive metal plate, a conductive coating membrane, and a tight coating membrane. The conductive coating membrane coats the conductive metal plate where the separator contacts the electrode. The tight coating membrane coats the conductive metal plate where the conductive coating membrane does not coat the conductive metal plate. A conductivity of the conductive coating membrane is higher than the tight coating membrane, and the tight coating membrane has a tighter adhesion to the conductive metal plate than the conductive coating membrane. The conductive coating membrane comprises carbon, a precious metal, or an alloy of nickel and chromium. The tight coating membrane comprises a close-grained resin. In the electrochemical fuel cell including the separator, the electric resistance between the separator and the electrode can be restrained low, and a rust problem caused by coming-off of the conductive coating membrane from the conductive metal plate can be avoided with high reliability.

52 Claims, 11 Drawing Sheets

SEPARATOR FOR FUEL CELL AND A METHOD FOR PRODUCING THE SEPARATOR

FIELD OF THE INVENTION

The present invention relates to a separator for an electrochemical fuel cell and a method for producing the separator. A separator comprising a conductive metal provides a path for a fuel gas or an oxidative gas to an electrode by contacting the electrode, and the separator functions as a wall of a unit cell of the electrochemical fuel cell.

BACKGROUND OF THE INVENTION

Previously, close-grained carbon graphite having a high conductivity and gas impermeability is, for example, coated on both surfaces of a separator made of a metal in an electrochemical fuel cell, as proposed in Japanese Laid-Open Patent Application No. 8-222237. This separator is produced by the steps as mentioned below. First, closed-grained graphite is coated on both surfaces of a metal plate made of aluminum, stainless steel, or etc. Next, a plurality of projections are shaped on a surface of the coated metal plate by an embossing or dimple-machining.

In the above-mentioned separator, the closed-grained carbon graphite could come off easily from the metal plate, because the contact between the metal plate and the close-grained graphite is not strong. Accordingly, reliability of the separator for rust resistance is low. Furthermore, since it is difficult to coat the closed-grained graphite uniformly on the metal plate, electrical resistance of the separator is high because of the coating, and the performance of the fuel cell deteriorates.

SUMMARY OF THE INVENTION

It is thus one object of the present invention to solve the aforementioned problems. Another object of the invention is to provide a separator which has high reliability for rust resistance of a metal plate. Another object of the invention is to provide a separator which restrains electrical resistance of the separator low and to provide an electrochemical fuel cell with a sufficient performance. Other object is to restrain adsorption of a metallic ion melted out from the separator to an electrolyte membrane. Furthermore, other object is to produce the aforementioned separator easily.

According to one aspect of the invention, as the first embodiment of a separator for an electrochemical fuel cell, the separator provides a path for a fuel gas or an oxidative gas to an electrode and functions as a wall of a unit cell, and the separator contacts an electrode. The separator includes a conductive metal plate, a conductive coating membrane which coats the conductive metal plate where the separator contacts the electrode, and a tight coating membrane which coats the conductive metal plate where the conductive coating membrane is not on the conductive metal plate. Incidentally, the fuel gas indicates a gas mainly containing hydrogen, and the oxidative gas indicates a gas mainly containing oxidant.

It is available that a conductivity of the conductive coating membrane is higher than the coating membrane, and the tight coating membrane has a tighter adhesion to the conductive metal plate than the conductive coating membrane.

The conductive coating membrane comprises, for example, carbon, a precious metal, or an alloy of nickel and chromium. The tight coating membrane, for example, comprises a close-grained resin.

In this embodiment, since the tight coating membrane contacts closely to the conductive metal plate with its tighter adhesion, the separator reliably prevents the conductive metal plate from rusting due to coming-off of the coating membrane including the conductive coating membrane and the tight coating membrane. Moreover, since the conductive coating membrane has a high conductivity, the electrical resistance of the separator caused by coating the coating membrane is restrained low. Consequently, the performance of the fuel cell is high.

As a modified embodiment to the first embodiment, the tight coating membrane includes a coating layer which is made of the same material as the conductive coating membrane, and an adhesive layer which bonds the coating layer to the conductive coating metal plate with a tighter adhesion than between the conductive coating membrane and the conductive metal plate. It is available that the coating layer comprises a heat expansional graphite seat or porous resin film permeated by carbon powder. It is also available that the adhesive layer comprises adhesive of epoxy resin or phenol resin.

Since the tight coating membrane includes an adhesive layer and the adhesive layer bonds the coating layer to the conductive metal plate with a tighter adhesion, the rust of the conductive metal plate caused by coming-off of the coating layer can be avoided with high reliability. Since the conductive coating membrane has a high conductivity, the electrical resistance of the separator is restrained low. The performance of the fuel cell with the separator is, then, high.

Next, as a second embodiment, a separator for an electrochemical fuel cell, provides a path for a fuel gas or an oxidative gas to an electrode and functions as a wall of a unit cell. The separator contacts the electrode and the separator include a conductive metal plate, a tight layer which is coated on the conductive metal plate, and a conductive coating membrane which is coated on the tight layer where the separator contacts the electrode. Furthermore, the tight layer bonds the conductive coating membrane to the conductive metal plate, and the tight layer comprises a high conductivity metal and has a heat softened high deformation characteristic.

Since the conductive coating membrane closely contacts the conductive metal plate owing to the heat softened high deformation characteristic of the tight layer, the rust problem caused by coming-off of the conductive coating membrane from the conductive metal plate can be avoided. Furthermore, since the conductive coating membrane closely contacts the conductive metal plate and the tight layer comprises a high conductivity, electrical resistance of the separator can also be restrained low.

Next, as a third embodiment, a separator for an electrochemical fuel cell provides a path for a fuel gas or an oxidative gas to an electrode and functions as a wall of a unit cell. The separator contacts the electrode, and the separator has a tight coating membrane made of a material being able to adsorb a metallic ion melted out from the conductive metal plate. The tight coating membrane coats the place where the separator forms a path for a fuel gas or an oxidative gas. It is available that the tight coating membrane is made of Schiff basic chelate resin and/or oxine chelate resin.

Since the tight coating membrane which forms the path for the fuel gas or the oxidative gas adsorbs a metallic ion, even though the metallic ion is melted out from the separator, an electrolyte membrane does not adsorb the metallic ion. The performance of the fuel cell is then high.

Next, a method for producing the separator of the first embodiment is explained briefly. The method comprises a step of placing a conductive coating membrane on a conductive metal plate where the separator contacts an electrode, a step of placing a tight coating membrane on the conductive metal plate where the conductive coating membrane is not on the conductive metal plate, a step of heating and pressing the conductive coating membrane and the tight coating membrane with the conductive metal plate. As mentioned above, the tight coating membrane has a tighter adhesion to the conductive metal plate than the conductive coating membrane.

By this method, since the conductive coating membrane closely contacts the conductive metal plate by heating and pressing the conductive metal plate, the conductive coating membrane, and the tight coating membrane, the separator which has high anti-rust and low electrical resistance characteristics is produced.

BRIEF DESCRIPTION OF THE DRAWINGS

The above and other objects, features, advantages, and technical and industrial significance of this invention will be better understood by reading the following detailed description of a presently preferred embodiment of the invention, when considered in connection with the accompanying drawing, in which.

DETAILED DESCRIPTION OF PREFERRED EMBODIMENTS

Figure 1:
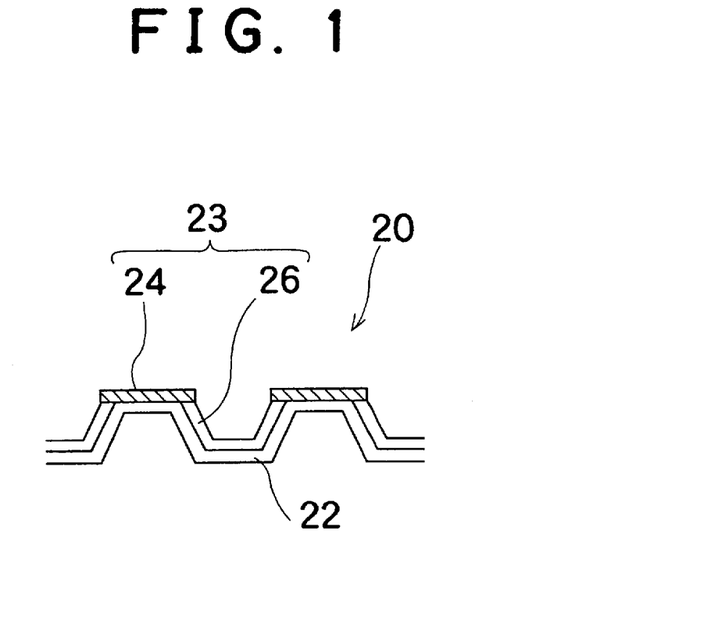
FIG. 1 is a schematic cross-sectional view of a part of a separator 20 for an electrochemical fuel cell, according to a first embodiment.

In the following description and the accompanying drawings, the present invention will be described in more detail in terms of specific embodiments. FIG. 1 schematically shows a partial cross-sectional view of a separator 20 for an electrochemical fuel cell as a first embodiment, and FIG. 2 is a plan view of the separator 20.

Figure 2:
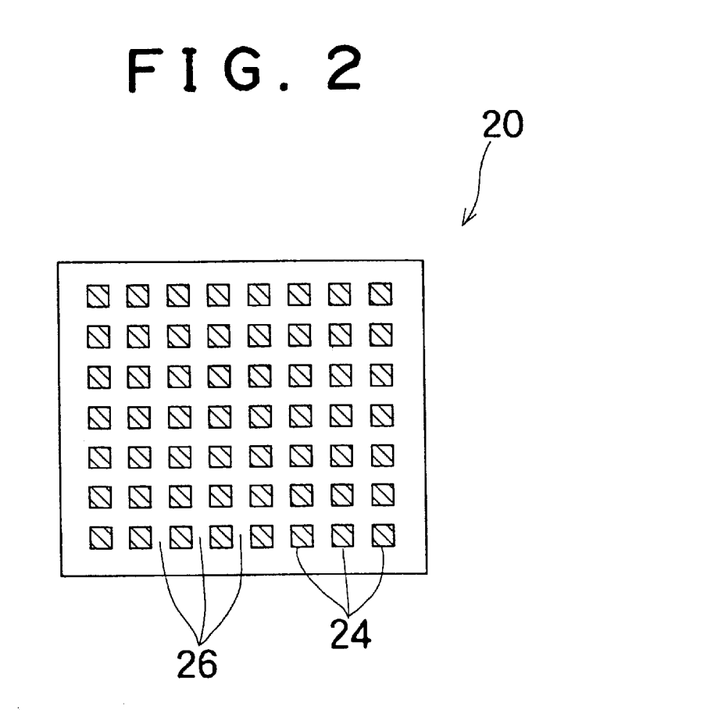
FIG. 2 is a schematic plan view of the separator 20.

As shown in FIG. 1 and 2, the separator 20 comprises a conductive metal plate 22, and a coating membrane 23 which coats one surface of the conductive metal plate 22. The conductive metal plate 22 is shaped like a seat, and has a high conductivity and a plurality of projections. The conductive metal plate 22, for example, comprises an aluminum, a stainless, or an alloy of nickel and chromium. A plurality of the separators 20, electrodes, electrolyte membranes, and etc. constitute an electrochemical fuel cell (not shown in figure) which belongs to a solid polymer electrolyte fuel cell. The separator 20 functions as a wall separating each unit cell. Because the electrode contacts a plurality of the projections of the separator 20, the separator 20 provides a fuel path for a flowing hydrogen gas or an oxygen path for a flowing oxidative gas.

The coating membrane 23 consists of a conductive coating membrane 24 and a tight coating membrane 26. The conductive coating membrane 24 is coated on the projected parts (that is, the aforementioned projections) of the conductive metal plate 22. The conductive coating membrane 24 has a high conductivity and is made of material which has a high rust resistance, for instances, carbon, a rare metal, or an alloy of nickel and chromium. Accordingly, the electrical resistance between the separator 20 and the electrode is low. The tight coating membrane 26 coats the conductive metal plate 22 where the conductive coating membrane 24 does not coat the conductive metal plate 22 (i.e. does not coat the surface of the projections of the separator 20). The tight coating membrane 26 has a high rust resistance and is made of material which forms a tighter adhesion to the conductive metal plate 22 than the conductive coating membrane 24, for example, a closed-grained resin. It is also available that the tight coating membrane 26 is made of chelate resin which adsorbs a metallic ion (later explained in details in the separator 320 of a third embodiment). Consequently, the tight coating membrane 26 prevents the coating membrane 23 from coming-off from the conductive metal plate 22, and a rust problem of the conductive metal plate 22 can be avoided with high reliability.

Figure 3:
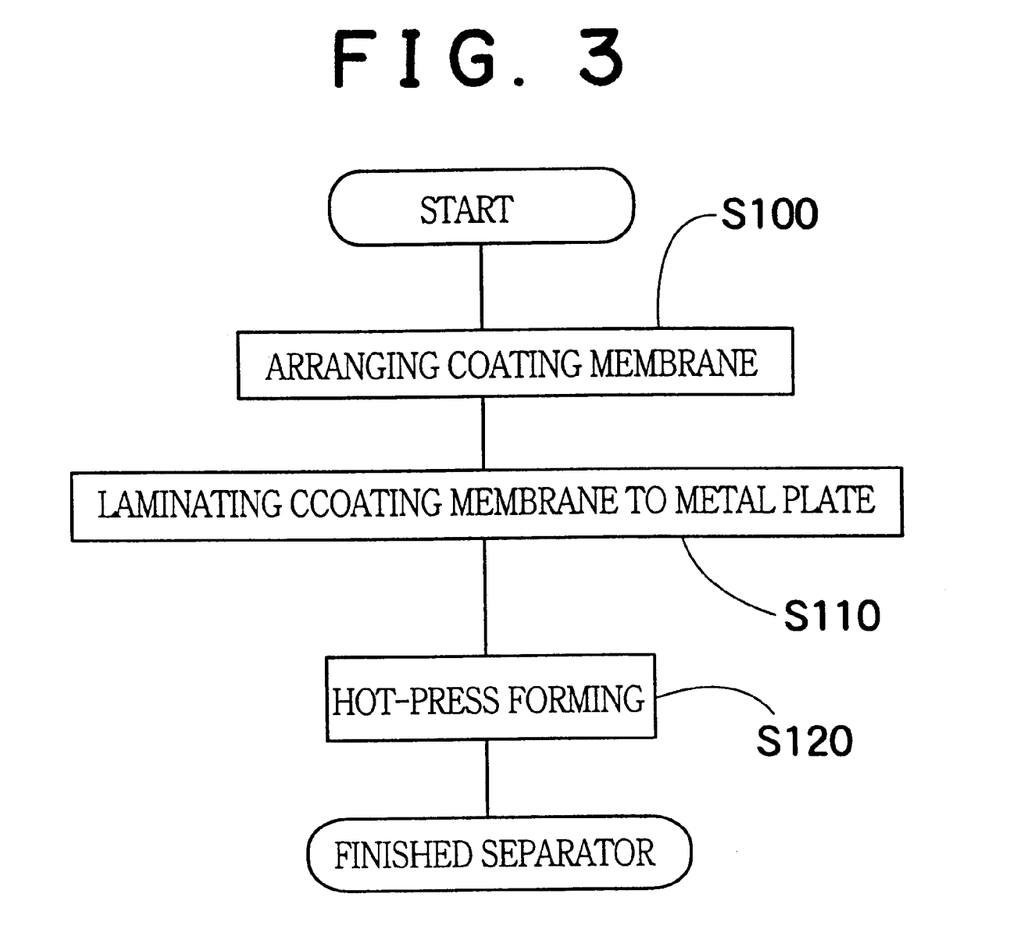
FIG. 3 is a flowchart which shows one example method for producing the separator 20.

Next, a method of producing the separator 20 of the first embodiment is explained. FIG. 3 is a flowchart which shows one example of methods for producing the separator 20. In the steps of producing the separator 20, first, the coating membrane 23 is arranged, as shown in S100 (hereinafter S indicates a step). That is, material having a high conductivity and a high rust resistance for the projections of the conductive metal plate 22 and material having a high rust resistance and a tight adhesion for the surface except the projections on the conductive metal plate 22 are arranged. Next, the arranged coating membrane 23 and a pre-formed metal plate 22a, which becomes later the conductive metal plate 22 after a press-forming, are laminated (S110). After the lamination, the coating membrane 23 and the pre-formed metal plate 22a are heated and pressed (this process is called hot-press), as shown in S120. The separator 20 is, thus, finished.

In the above-mentioned hot-press step, the coating membrane 23 is closely contacted to the pre-formed metal plate 22a (that is, the conductive metal plate 22) and concurrently a plurality of the projections are shaped on the conductive metal plate 22. When the coating membrane 23 and the pre-formed metal plate 22a are laminated in S110, they are determined to position so that the conductive coating membrane 24, which is made of material having a high conductivity and high rust resistance, faces the projections of the conductive metal plate 22.

Figure 4:
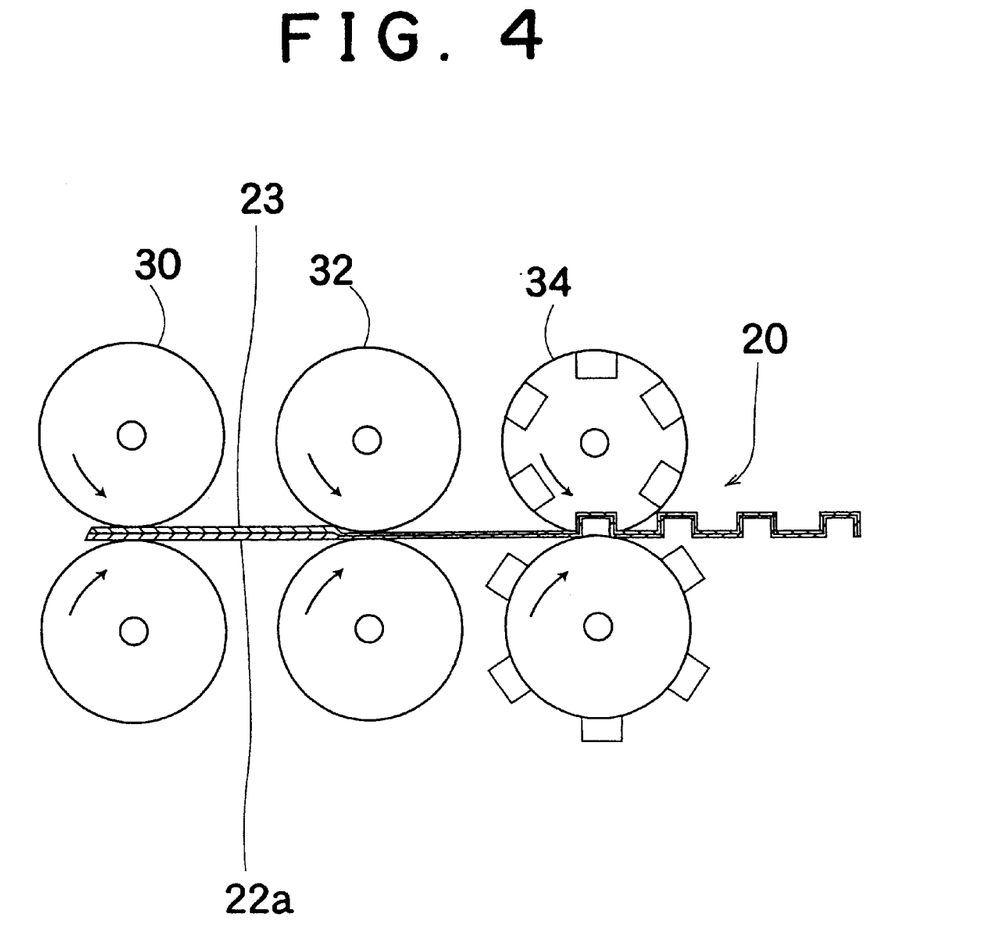
FIG. 4 is an illustration showing one example of the step 110 and the step 120 in FIG. 3.

FIG. 4 is an illustration showing one example of the step 110 and the step 120 in FIG. 3. The arranged coating membrane 23 is rolled on a rolling holder 30, and the coating membrane 23 supplied from the rolling holder 30 is laminated on the pre-formed metal plate 22a. The laminated plate including the pre-formed metal plate 22a and the coating membrane 23 is heated and pressed by a pair of hot-press rollers 32 that closely contacts with high and tight strength. Finally, a plurality of projections, necessary dimples, or etc. are shaped. The separator 20 is thus finished.

Figure 5:
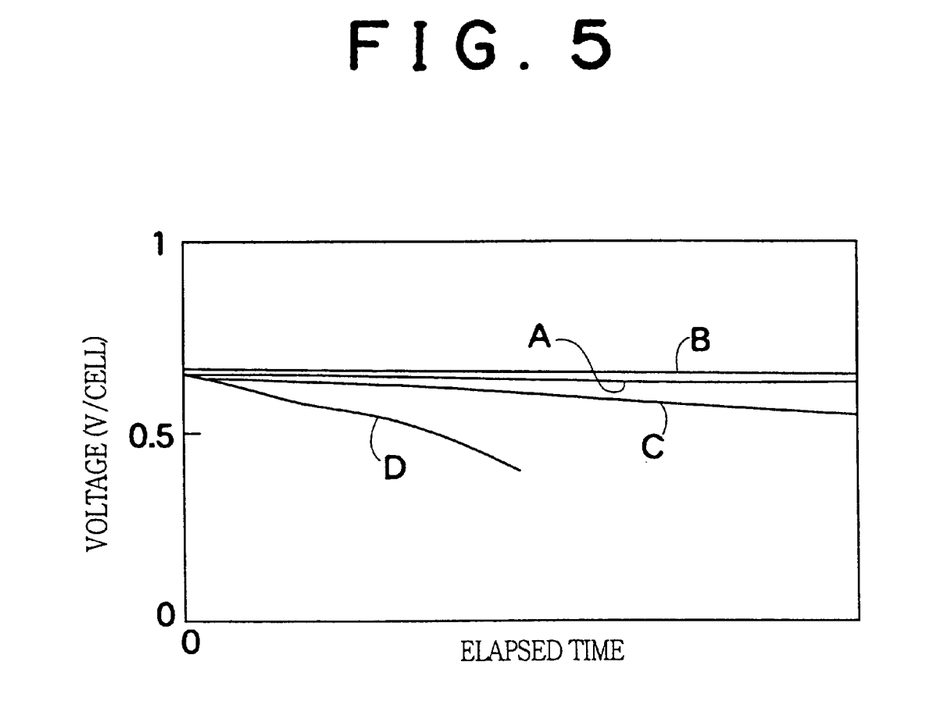
FIG. 5 is a graph which shows the relation between a voltage gained by a unit cell in the fuel cell including the separator 20 and an elapsed time.

The relation between a voltage gained by a unit cell in the fuel cell including the separator 20, which is produced as mentioned above, and an elapsed time is shown in FIG. 5. The line A shows the case of one unit cell using the separator 20 of the first embodiment, and the line C shows the case of one unit cell using the conventional separator which is coated on a conductive metal plate by a coating membrane made of a close-grained carbon graphite. The line D shows the case of one unit cell including the separator which is not coated on the conductive metal plate. Incidentally, the line B is explained later. As illustrated in FIG. 5, the voltage of the line A is in the early stage a little bit higher than the other lines C or D, because the electrical resistance between the separator and the electrode is lower. In the unit cell having the conventional separator, the voltage gained by the unit cell decreases with the elapsed time. The unit cell with the separator 20 of the first embodiment, however, supplies an approximately constant voltage over the elapsed time.

As mentioned above, since the part on the conductive metal plate 22, where the separator 20 contacts the electrode, is coated by the material having a high conductivity and a high rust resistance and the other part on the conductive metal plate 22 is coated by the material having a tighter adhesion, the electrical resistance between the separator 20 and the electrode can be restrained low. Furthermore, since the coating membrane 23 does not easily come off from the conductive metal plate 22, the conductive metal plate 22 is prevented from rusting with high reliability. By the above-mentioned method of producing the separator 20, the separator 20 of the first embodiment can be produced smoothly and easily.

Figure 6:
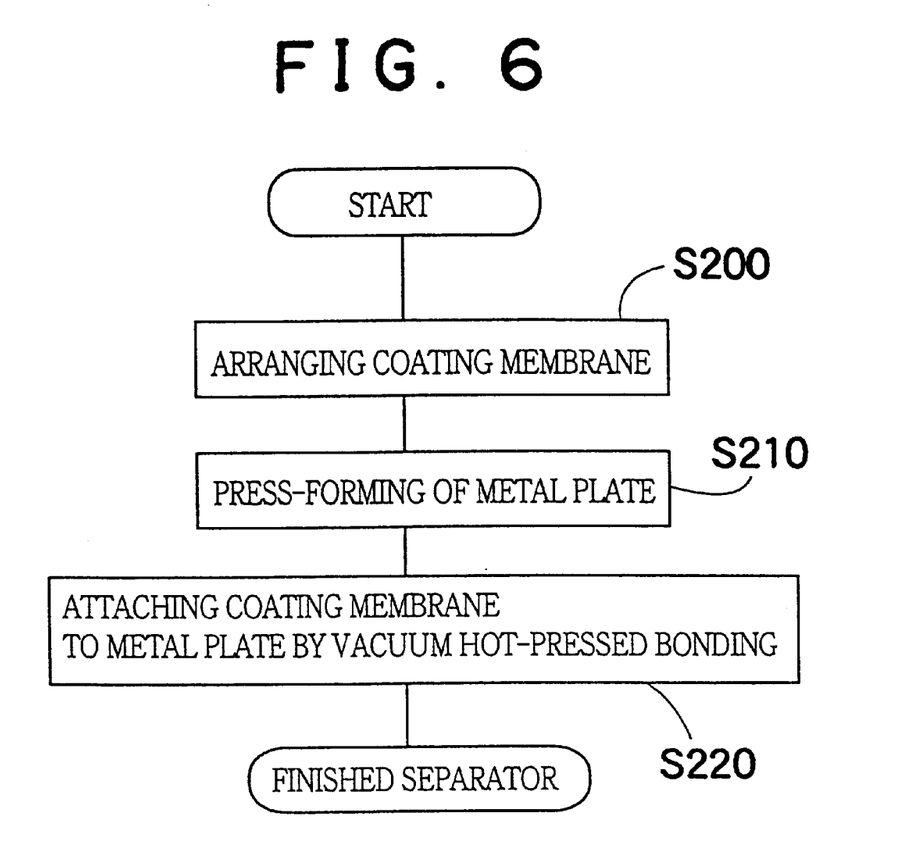
FIG. 6 is a flowchart which shows another example method for producing the separator 20.

In the aforementioned method, the separator 20 is finished by heating and pressing after laminating the coating membrane 23 to the pre-formed metal plate 22a. A modified method as shown in FIG. 6 is, however, also available. In the same manner as the step explained in S100, in S200 the coating membrane 23 is arranged. But after this step differences come out as follows. The pre-formed metal plate 22a is formed by pressing in S210. The coating membrane 23 arranged in S200 is attached to the formed metal plate 22 (that is, the conductive metal plate 22) by vacuum hot-pressed bonding in S220.

Moreover, the following method is also available. Ink having a conductivity and a rust resistance is printed on the part where the projections would be shaped in the pre-formed metal plate 22a by a screen printing. Ink having a rust resistance and a tight adhesion is printed on the part where projections would not be shaped in the pre-formed metal plate 22a by a screen printing. After these steps the printed metal plate 22a is formed by hot-pressing. In this method, either way is also available whether the screen printing on the part of projections is executed earlier than on the other part except the projections on the pre-formed metal plate 22a, or opposite turn.

Figure 7:
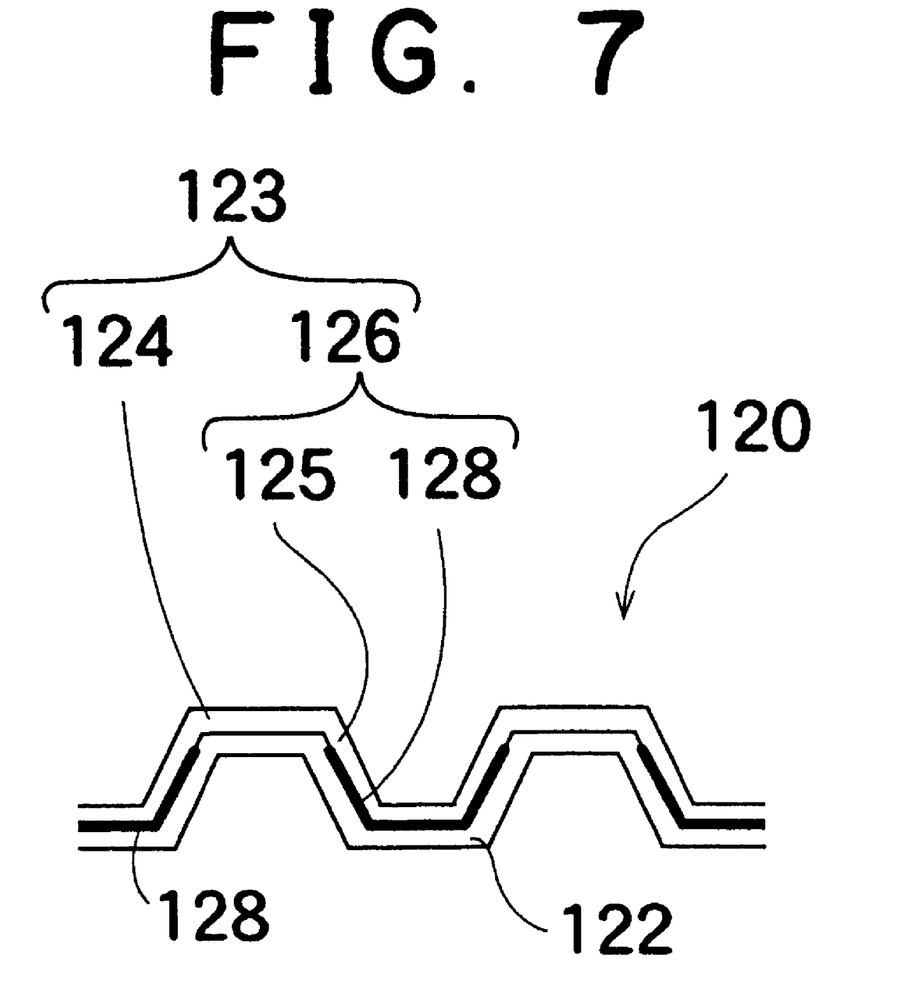
FIG. 7 is a schematic cross-sectional view of a part of a separator 120 for an electrochemical fuel cell, as a modified one of the first embodiment.

Next, a separator 120 according to a modified embodiment of the first embodiment is explained. FIG. 7 is a schematic cross-sectional view of a part of a separator 120 for an electrochemical fuel cell, as the modified embodiment. The separator 120 comprises a conductive metal plate 122 and a coating membrane 123. The conductive metal plate 122 is the same as the conductive metal plate 22 in the first embodiment. The coating membrane 123 comprises a conductive coating membrane 124 and a tight coating membrane 126, and the tight coating membrane 126 consists of a coating layer 125 and an adhesive layer (called a binder) 128. The conductive coating membrane 124 is deposited on projections of the conductive metal plate 122. A material of the coating layer 125 has a high conductivity, because it is made of the same material as the conductive coating membrane 124. The binder 128 is between the coating layer 125 and the conductive metal plate 122. It is not necessary that the binder 128 is between the conductive metal plate 122 and the conductive coating membrane 124, because the part where the separator 120 contacts the electrode is pressed from the electrode when an electrochemical fuel cell is assembled including the separator 120 and the conductive coating membrane 124 closely and tightly contacts the conductive metal plate 122. The electrochemical fuel cell including the separator 120 functions the same as the fuel cell having the separator 20 of the first embodiment.

The conductive coating membrane 124 or/and the coating later 125 is a uniform thickness membrane made of a material having a high conductivity and a rust resistance, for example, a heat expansional graphite seat, porous resin film permeated by carbon powder, or etc. The binder 128 is made of an adhesive of epoxy resin, phenol resin, or etc. and it contributes to strengthen adhesive tightness between the conductive metal plate 122 and the coating layer 125. By using the coating membrane 123 including the binder 128, the conductive coating membrane 124, and the coating layer 125, an electrical resistance between the separator 120 and the electrode is restrained low. Furthermore, the coating membrane 123 is prevented from coming-off of the conductive metal plate 122, and consequently a rust problem of the conductive metal plate 122 can be avoided.

Figure 8:
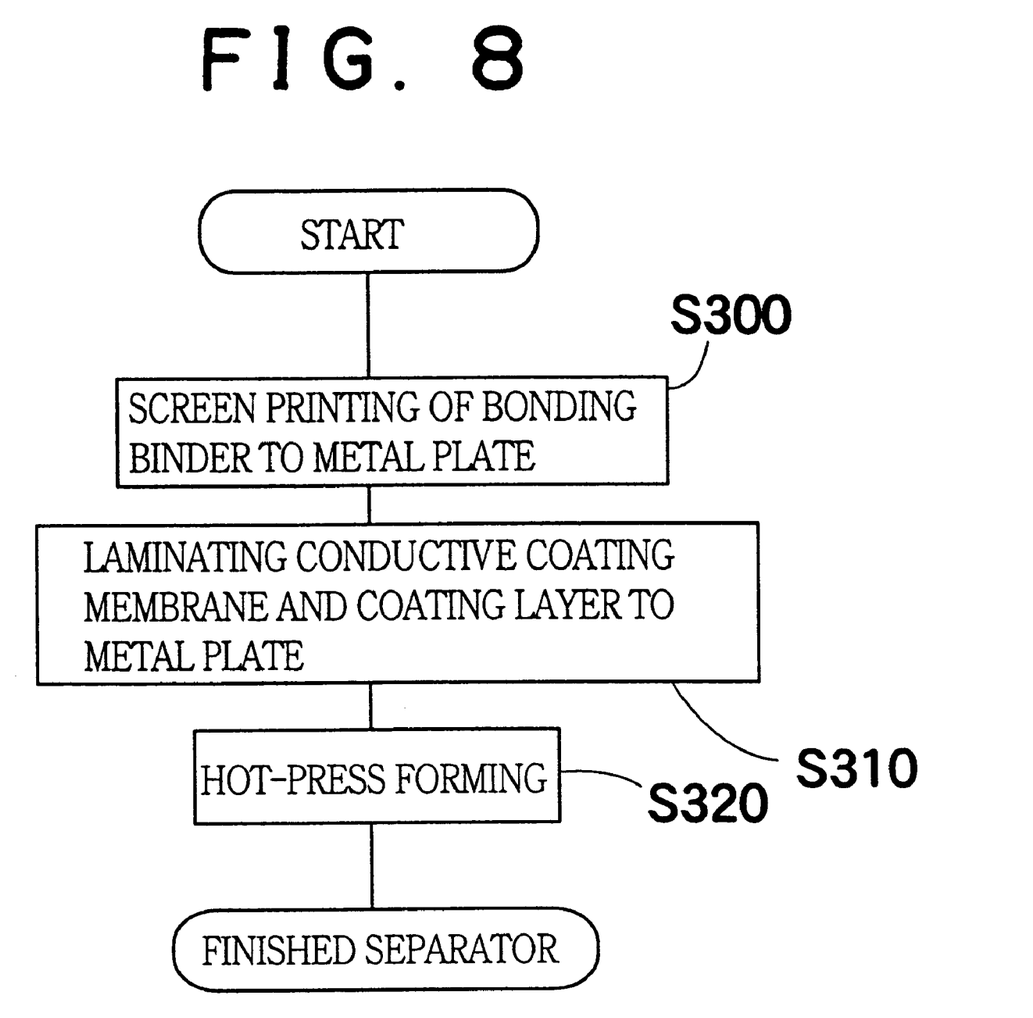
FIG. 8 is a flowchart which shows a method for producing the separator 120.
Figure 9:
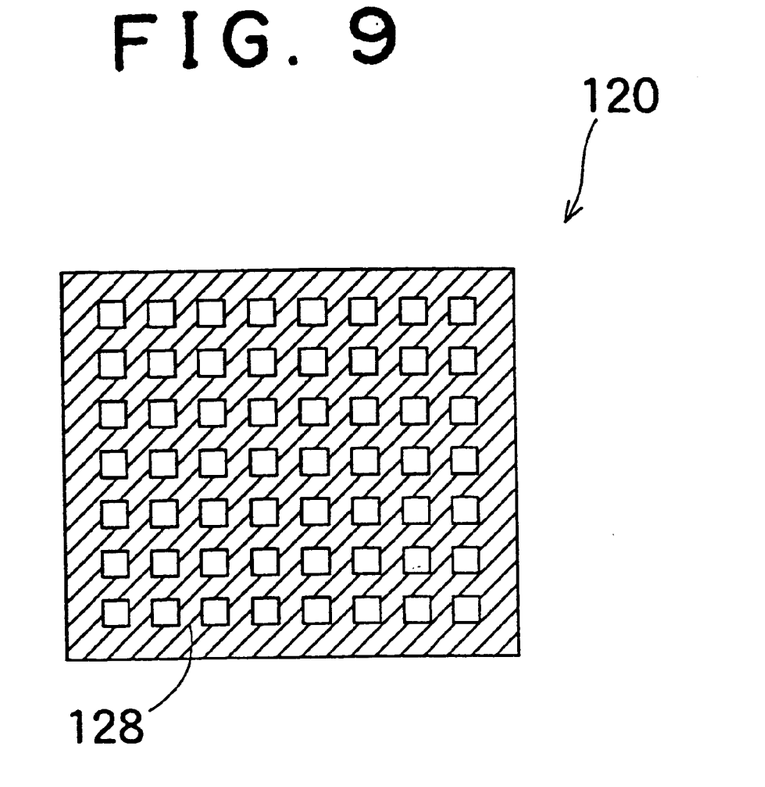
FIG. 9 is an illustration showing a binder (i.e. an adhesive layer) 128 which is printed on a conductive metal plate.

The above-mentioned separator 120 is produced as shown in the flowchart of FIG. 8. First, the binder 128, which is an adhesive layer arranged to like ink condition, is screen-printed on the non-projected part of the conductive metal plate 122, as shown in S300. FIG. 9 shows the binder 128 printed on the conductive metal plate 122. The conductive coating membrane 124 and the coating layer 125 (here, they constitutes substantially one piece membrane) are laminated to the conductive metal plate 122 with the binder 128 (shown in S310). After they are positioned so that the part where the binder 128 is not printed would fit to and face the projections of the conductive metal plate 122, a hot-press forming is executed, as shown in S320. The separator 120 of the modified embodiment is thus finished. The producing process illustrated in FIG. 4 is also suitable to this method of producing the separator 120, if the conductive coating membrane 124 and the coating layer 125 are rolled on the rolling holder 30 in place of the coating membrane 23.

The relation between a voltage gained by a unit cell in the fuel cell including the separator 120 which is produced as mentioned above and an elapsed time, is shown by the line B in FIG. 5. With reference to FIG. 5, the unit cell using the separator 120 supplies a higher voltage in the initial stage and maintains a substantially constant voltage after a considerable long elapsed time. Accordingly, it can be understood that the electrical resistance is low and the rust problem caused by coming-off of the coating membrane 123 from the conductive metal plate 122 is avoided.

In the aforementioned separator 120 of the modified embodiment, the electrical resistance between the separator 120 and the electrode can be restrained low by using the coating membrane 123 which is made of material having a high conductivity and a high rust resistance, and has a uniform thickness. Since the binder 128 is used in the part where the separator 120 does not contact, the coating membrane 123 is closely and tightly contacted. The rust problem caused by that the coating membrane 123 pealing off from the conductive metal plate 122 can be prevented with high reliability. By the aforementioned method, the separator 120 can be produced smoothly and easily.

In the method of producing the separator 120, the separator 120 is completed by laminating the conductive metal plate 122 with the binder 128 and the coating membrane 123 without the binder 128, and hot-press forming. It is also available that the separator 120 is finished by the following steps. First, the conductive metal plate 122 is formed by pressing. Next, the binder 128 is applied on the metal plate 122, and the conductive coating membrane 124 and the coating layer 125 are contacted closely and tightly by hot-pressing. In another way, it is also available that the conductive coating membrane 124 and the coating layer 125 comprising the heat expansional graphite power is rolled and pressed on the conductive metal plate 122 on which the binder 128 is applied, the coating membrane 123 is contacted tightly on the conductive metal plate 122, and a plurality of projections of the separator 120 are shaped by hot-press forming.

Figure 10:
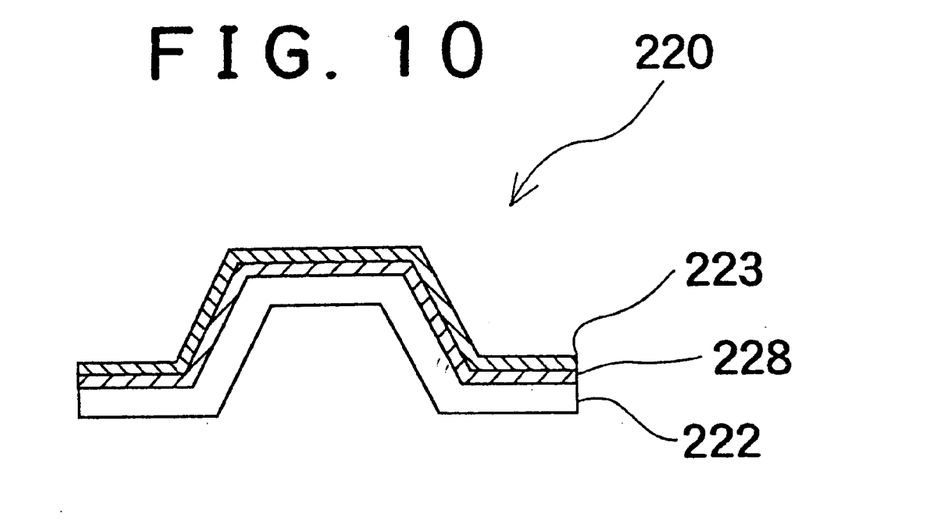
FIG. 10 is a schematic cross-sectional view of a part of a separator 220 for an electrochemical fuel cell, as a second embodiment.

Next, a separator 220 according to a second embodiment is explained. FIG. 10 shows a schematic partial cross-sectional view of the separator 220. The separator 220 of the second embodiment comprises a conductive metal plate 222, a tight layer 228, and a conductive coating membrane 223. The conductive metal plate 222 is basically the same as the conductive metal plate 22 of the first embodiment. The conductive coating membrane 223 is made of the same material as the material of the conductive coating membrane 124 shown in FIG. 7. The tight layer 228 is between the conductive coating membrane 223 and the conductive metal plate 222 and comprises heat softened metal plating (hereinafter the tight layer 228 is called heat softened metal plating 228). It is available that the heat softened metal plating 228 is between the conductive coating membrane 223 and at least a part of the conductive metal plate 222 in a part which does not contact the electrode. An electrochemical fuel cell including the separator 220 functions the same as the above-mentioned fuel cell including the separator 20 of the first embodiment.

The heat softened metal plating 228 is a plated layer on the conductive metal plate 222. The metal plating has a high conductivity and is made of a metal which is easily softened at the lower temperature than the conductive metal plate 222, for example tin, nickel, or etc. The heat softened metal plating 228 contributes to strengthen close contact between the conductive coating membrane 223 and the conductive metal plate 222. By using the conductive coating membrane 223 and the heat softened metal plating 228, the electrical resistance between the separator 220 and the electrode is restrained low, and a rust problem caused by coming-off of the conductive coating membrane 223 from the conductive metal plate 222 is avoided.

Figure 11:
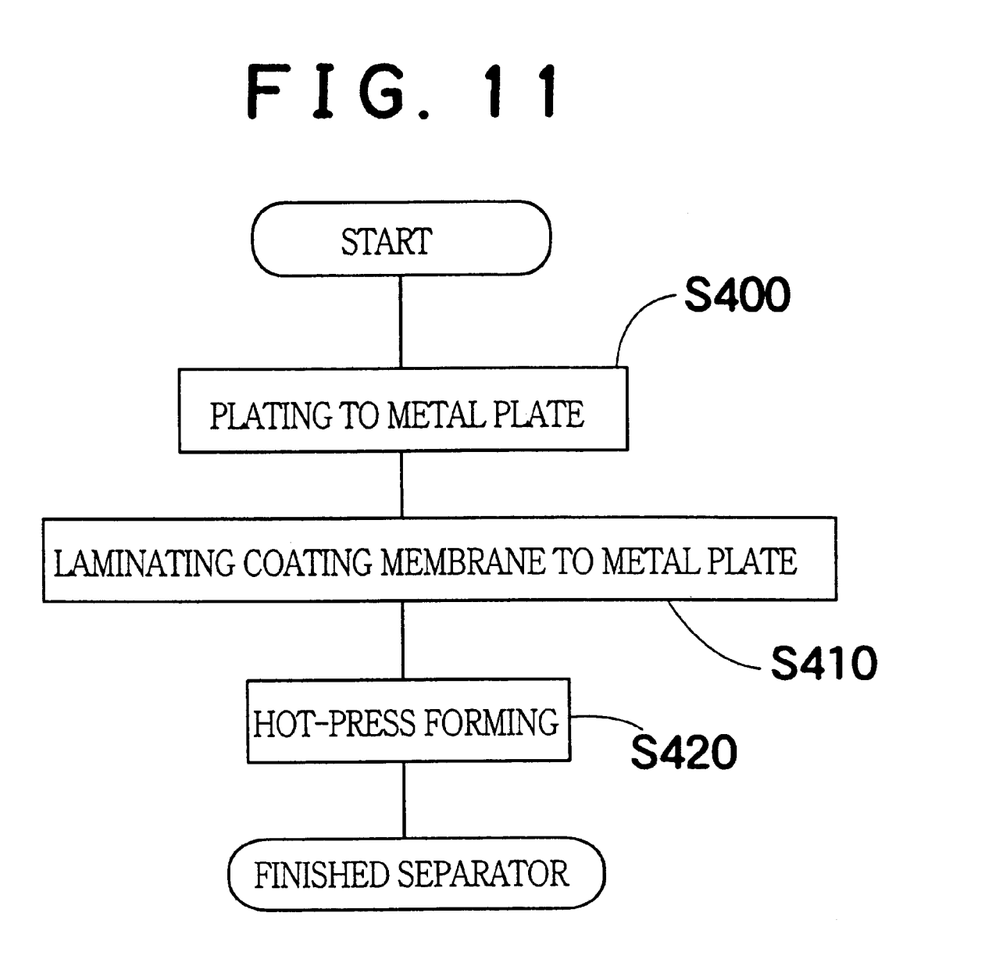
FIG. 11 is a flowchart which shows an example method for producing the separator 220.

The separator 220 of the second embodiment is produced on the bases of the flowchart in FIG. 11. First, the heat softened metal plating 228 is plated on the conductive metal plate 222 in S400. Next, The conductive coating membrane 223 is laminated on the conductive metal plate 222 with the heat softened metal plating 228 (S410). The separator 220 is completed by hot-press forming the above-mentioned laminated plates (S420). In this producing method, since the heat softened metal plate 228 is plated on the one whole surface of the conductive metal plate 222, it is not necessary to arrange the position of the conductive coating membrane 223 against the conductive metal plate 222 with the heat softened metal plating 228 in the hot-press forming, though arranging the positioning is necessary in the producing methods shown in FIG. 3 or 6. Incidentally, the above-mentioned method in FIG. 4 can be adopted to produce the separator 220, if the conductive coating membrane 223 is rolled on the rolling holder 30 in place of the coating membrane 23.

The relation between a voltage gained by a unit cell in a fuel cell including the separator 220 which is produced as mentioned above and an elapsed time, is also shown by the line B in FIG. 5. Consequently, the unit cell using the separator 220 supplies a higher voltage in the initial stage and maintains a substantially constant voltage whether a time elapses much or less, just in the same way as the unit cell using the separator 120.

Concerning the above-mentioned separator 220, since the conductive coating membrane 223 having a conductivity, a rust resistance, and a uniform thickness, is closely and tightly contacted to the conductive metal plate 222 by way of the heat softened metal plate 228, the electrical resistance between the separator 220 and the electrode can be restrained low. Moreover, a rust problem caused by coming-off of the coating membrane 223 from the conductive metal plate 222 can be avoided with high reliability. The separator 220 can be smoothly and easily produced by the aforementioned method.

Figure 12:
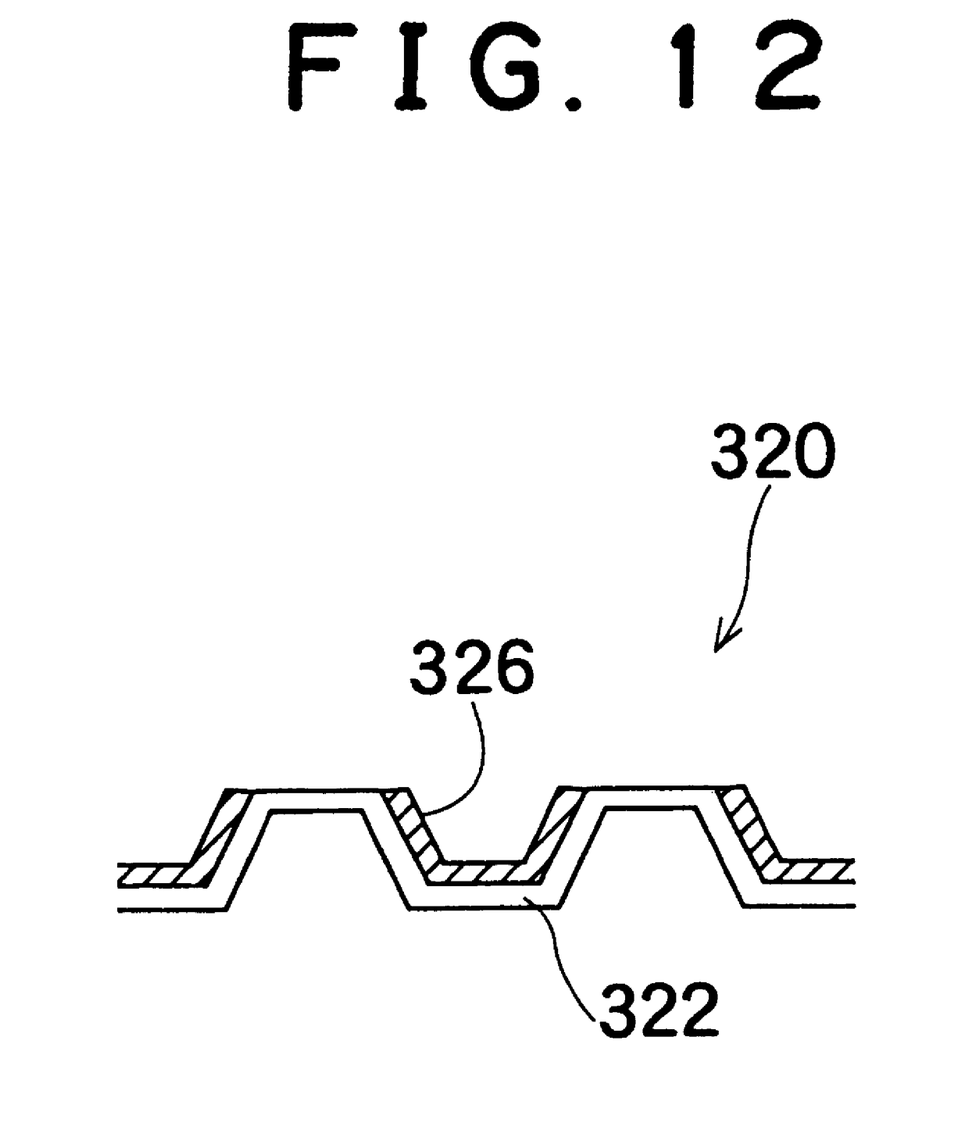
FIG. 12 is a schematic cross-sectional view of a part of a separator 320 for an electrochemical fuel cell, as a third embodiment.

Next, a separator 320 as a third embodiment is explained. FIG. 12 is a schematic cross-sectional view of a part of a separator 320 for an electrochemical fuel cell, as a third embodiment. The separator 320 as the third embodiment comprises a metal plate 322, which is the same as the metal plate of the first embodiment, and a tight coating membrane 326 which is made of chelate resin. The chelate resin has a characteristic of absorbing a metallic ion. When the separator 320 of the third embodiment is adopted for an electrochemical fuel cell, it functions in the same way as one of the separator 20 of the first embodiment.

The tight coating membrane 326 coats a surface where the metal plate 322 is not projected, that is, where the metal plate 322 does not contact an electrode. Resin which is adsorptive to a metallic ion such as an ion of aluminum, iron, nickel, or etc. (they are used for the metal plate 322) is available, as the chelate resin used for the tight coating membrane 326. For example, Schiff basic chelate resin which adsorbs $Fe^{2+}$, $Co^{2+}$, $Ni^{2+}$, $Cu^{2+}$, $Zn^{2+}$, or etc., or oxine chelate resin which adsorbs $Cu^{2+}$, $Co^{2+}$, $Ni^{2+}$, $Al^{3+}$, $Fe^{3+}$, $Ti^{4+}$, $Zr^{4+}$, etc. is available. The Schiff basic chelate resin and the oxin chelate resin are shown below. The Schiff basic chelate resin and the oxin chelate resin are shown below.

(2)

(3)

Such chelate resin has a three-dimensional network structure having a functional group (chelate functional group) which forms a metal ion and a chemical compound. The chelate resin forms a complex strongly and selectively. Accordingly, since the tight coating membrane 326 adsorbs the metallic ion melted out from the metal plate 322, the adsorption of the metal ion to the electrolyte membrane can be avoided.

Figure 13:
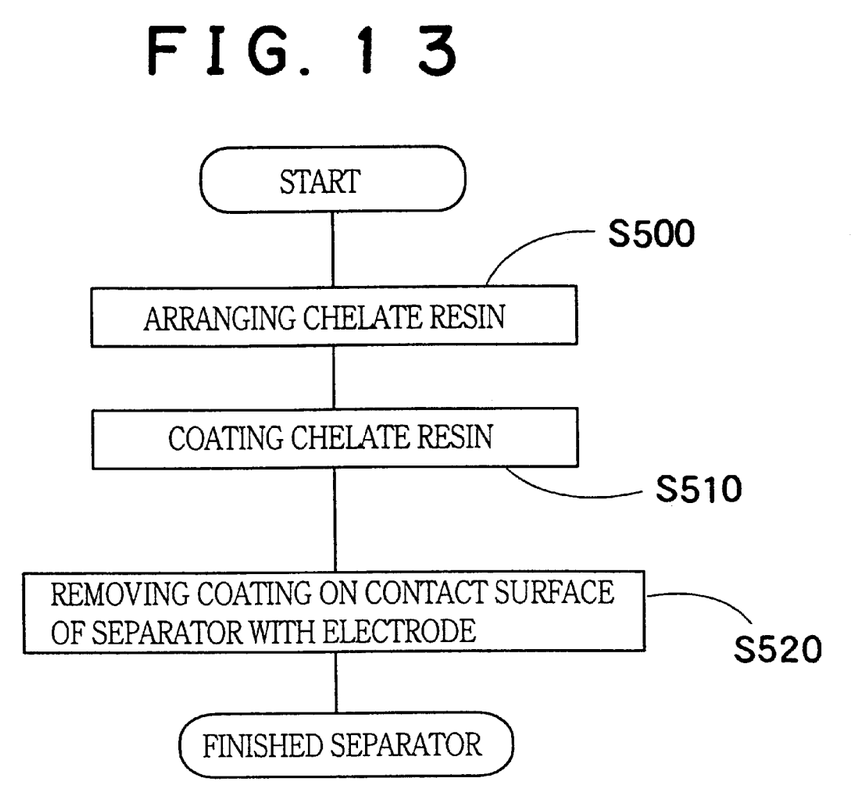
FIG. 13 is a flowchart which shows an example method for producing the separator 320.

Next, a method of producing the separator 320 of the third embodiment is explained. FIG. 13 is a flowchart which shows an example method for producing the separator 320. First, a chelate resin is arranged in S500. The chelate resin is obtained by a polymerization or a copolymerization of polymer having a chelate functional group. For example, sondensation polymerization of bi-functional aldehydes and bi-functional amines is done in the arranging of the Schiff basic chelate resin. The chelate resin is coated on one entire surface of the metal plate 322 in S510. Incidentally, projections are already shaped on the metal plate 322. In S520 the chelate resin coated on the projections is removed. Then, the separator 320 is finished.

According to above-mentioned separator 320 of the third embodiment 320, by coating the chelate resin on the surface which does not contact the electrode, the surface does not rust. Since the tight coating membrane 326 adsorbs the metallic ion even though the metallic ion melts out from the metal plate 322, the adsorption of the metallic ion to the electrolyte membrane can be restrained, and a proton conductivity does not occur because of adsorption of the metallic ion. The performance of the electrochemical fuel cell comprising the separator 320, then, maintains high. By adopting the method of producing the separator 320, it can be produced in easy way.

Incidentally, the surface of the projections which contacts the electrode is not coated in the separator 320 of the third embodiment. However it is also available that the surface is coated by a material having an electrical conductivity and an excellent anti-corrosion such as the separator 20 of the first embodiment. Not only the corrosion of the separator 320 can be reliably avoided, but the deterioration caused by melting out of the metallic ion can be prevented.

In the above-mentioned method of producing the separator 320, the chelate resin is arranged and coated. It is also available that chelating ligand is introduced to the high polymer resin coated by a polystyrene or a polyvinyl chloride. As this method, for example, amino-carboxylic acid chelate resin which forms a complex with $Hg^{2+}$, $Cu^{2+}$, $Fe^{3+}$, $Ni^{2+}$, $Pb^{2+}$, $Cr^{3+}$, $Zn^{2+}$, or etc. can be used to coat on the metal plate 322. Incidentally, one example of the amino-carboxylic chelate resin is expressed by the following equation.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A separator for an electrochemical fuel cell, said separator providing a path for a fuel gas or an oxidative gas to an electrode and functioning as a wall of a unit cell, said separator contacting said electrode, and said separator comprising:
    a conductive metal plate having a surface;
    a conductive coating membrane on at least a first region of said conductive metal plate where said separator contacts said electrode; and
    a tight coating membrane on at least a second region of said surface of said conductive metal plate where said path for said fuel gas or said oxidative gas is formed, said tight coating membrane being capable of forming a tighter adhesion to said conductive metal plate than said conductive coating membrane.

2. The separator according to claim 1, wherein a conductivity of said conductive coating membrane is higher than said tight coating membrane.

3. The separator according to claim 1, wherein said tight coating membrane comprises:
    a coating layer made of the same material as said conductive coating membrane; and
    an adhesive layer for bonding said coating layer to said conductive metal plate with a tighter adhesion than between said conductive coating membrane and said conductive metal plate.

4. The separator according to claim 3, wherein said coating layer comprises a graphite sheet or porous resin film permeated by carbon powder.

5. The separator according to claim 3, wherein said adhesive layer comprises an adhesive of epoxy resin or phenol resin.

6. The separator according to claim 2, wherein said tight coating membrane comprises a material being able to adsorb a metallic ion melted out from said conductive metal plate.

7. The separator according to claim 6, wherein said material comprises chelate resin.

8. The separator according to claim 6, wherein said material comprises Schiff basic chelate resin or oxine chelate resin.

9. The separator according to claim 2, wherein said tight coating membrane comprises a material having a higher ability of adsorbing a metallic ion melted out from said conductive metal plate than said conductive coating membrane.

10. The separator according to claim 9, wherein said material comprises chelate resin.

11. The separator according to claim 9, wherein said material comprises Schiff basic chelate resin or oxine chelate resin.

12. The separator according to claim 1, wherein said tight coating membrane has a tighter adhesion to said conductive metal plate than said conductive coating membrane.

13. The separator according to claim 12, wherein said tight coating membrane comprises:
   a coating layer made of the same material as said conductive coating membrane; and
   an adhesive layer for bonding said coating layer to said conductive metal plate with a tighter adhesion than between said conductive coating membrane and said conductive metal plate.

14. The separator according to claim 13, wherein said coating layer comprises a graphite sheet or porous resin film permeated by carbon powder.

15. The separator according to claim 13, wherein said adhesive layer comprises an adhesive of epoxy resin or phenol resin.

16. The separator according to claim 12, wherein said tight coating membrane comprises a material being able to adsorb a metallic ion melted out from said conductive metal plate.

17. The separator according to claim 16, wherein said material comprises chelate resin.

18. The separator according to claim 16, wherein said material comprises Schiff basic chelate resin or oxine chelate resin.

19. The separator according to claim 12, wherein said tight coating membrane comprises a material having a higher ability of adsorbing a metallic ion melted out from said conductive metal plate than said conductive coating membrane.

20. The separator according to claim 19, wherein said material comprises chelate resin.

21. The separator according to claim 19, wherein said material comprises Schiff basic chelate resin or oxine chelate resin.

22. The separator according to claim 1, wherein said conductive coating membrane comprises carbon, a precious metal, or an alloy of nickel and chromium.

23. The separator according to claim 1, wherein said tight coating membrane comprises a material having a high rust resistance, and which forms a tighter adhesion to the conductive metal plate than the conductive coating membrane.

24. The separator according to claim 23, wherein said tight coating membrane comprises:
   a coating layer made of the same material as said conductive coating membrane; and
   an adhesive layer for bonding said coating layer to said conductive metal plate with a tighter adhesion than between said conductive coating membrane and said conductive metal plate.

25. The separator according to claim 24, wherein said coating layer comprises a graphite sheet or porous resin film permeated by carbon powder.

26. The separator according to claim 24, wherein said adhesive layer comprises an adhesive of epoxy resin or phenol resin.

27. The separator according to claim 1, wherein said tight coating membrane comprises a material being able to adsorb a metallic ion melted out from said conductive metal plate.

28. The separator according to claim 27, wherein said material comprises chelate resin.

29. The separator according to claim 27, wherein said material comprises Schiff basic chelate resin or oxine chelate resin.

30. The separator according to claim 1, wherein said tight coating membrane comprises a material having a higher ability of adsorbing a metallic ion melted out from said conductive metal plate than said conductive coating membrane.

31. The separator according to claim 30, wherein said material comprises chelate resin.

32. The separator according to claim 30, wherein said material comprises Schiff basic chelate resin or oxine chelate resin.

33. A separator for an electrochemical fuel cell, said separator providing a path for a fuel gas or an oxidative gas to an electrode and functioning as a wall of a unit cell, said separator contacting said electrode, and said separator comprising:
   a conductive metal plate;
   a tight layer on said conductive metal plate; and
   a conductive coating membrane on said tight layer where said separator contacts said electrode,
   wherein:
      said tight layer bonds said conductive coating membrane to said conductive metal plate, and said tight layer comprises a high conductivity metal, the tight layer being more easily softened at lower temperatures than the conductive metal plate; and
      said tight layer is capable of forming a tighter adhesion to said conductive metal plate than said conductive coating membrane.

34. The separator according to claim 33, wherein said tight layer is between said conductive coating membrane and at least a part of said conductive metal plate in a part which does not contact said electrode.

35. The separator according to claim 33, wherein said tight layer comprises heat softened metal plating.

36. The separator according to claim 35, wherein said heat softened metal plating comprises nickel or tin.

37. A separator for an electrochemical fuel cell, said separator providing a path for a fuel gas or an oxidative gas to an electrode and functioning as a wall of a unit cell, said separator contacting said electrode, and said separator comprising:
   a conductive metal plate having a surface, said surface having a first region where said conductive metal plate contacts said electrode; and
   a membrane comprising a material being able to adsorb a metallic ion melted out from said conductive metal plate, said membrane on at least a second region of said surface of said conductive metal plate where said path for said fuel gas or said oxidative gas is formed.

38. The separator according to claim 37, wherein said material comprises Schiff basic chelate resin or oxine chelate resin.

39. A method for producing a separator for an electrochemical fuel cell, said separator providing a path for a fuel gas or an oxidative gas to an electrode and functioning as a wall of a unit cell, said separator contacting said electrode, and said method comprising:
   placing a conductive coating membrane on at least a first region of a surface of a conductive metal plate where said separator contacts said electrode; and
   placing a tight coating membrane on at least a second region of said surface of said conductive metal plate where said path for said fuel gas or said oxidative gas is formed, said tight coating membrane having a tighter adhesion to said conductive metal plate than said conductive coating membrane.

40. The method according to claim 39, wherein said placing the tight coating membrane step is executed after said placing the conductive coating membrane step.

41. The method according to claim 39, wherein said placing the conductive coating membrane step is executed after said placing the tight coating membrane step.

42. The method according to claim 39, wherein said placing the conductive coating membrane step and said placing the tight coating membrane step are executed concurrently.

43. The method according to claim 42 further comprises heating and pressing said conductive coating membrane and said tight coating membrane with said conductive metal plate.

44. A method for producing a separator for an electrochemical fuel cell, said separator providing a path for a fuel gas or an oxidative gas to an electrode and functioning as a wall of a unit cell, said separator contacting said electrode, and said method comprising:
  press-forming a conductive metal plate, said conductive metal plate having a surface; and
  heating and pressing a conductive coating membrane and a tight coating membrane on said conductive metal plate, said conductive coating membrane being on at least a first region of said surface of said conductive metal plate where said separator contacts said electrode, said tight coating membrane being on at least a second region of said surface of said conductive metal plate where said path for said fuel gas or said oxidative gas is formed, and said tight coating membrane having a tighter adhesion to said conductive metal plate than said conductive coating membrane.

45. The method according to claim 43, wherein said heating and pressing comprises vacuum hot-pressed bonding.

46. The method according to claim 44, wherein said heating and pressing comprises vacuum hot-pressed bonding.

47. A method for producing a separator for an electrochemical fuel cell, said separator providing a path for a fuel gas or an oxidative gas to an electrode and functioning as a wall of a unit cell, said separator contacting said electrode, and said method comprising:
  placing a conductive coating membrane on at least a first region of a surface of a conductive metal plate where said separator contacts said electrode; and
  coating a tight coating membrane comprising an adhesive layer and a coating layer on said conductive metal plate, wherein the tight coating membrane comprises:
    I. coating an adhesive layer on at least a second region of said surface of said conductive metal plate, said adhesive layer being on said conductive metal plate where said path for said fuel gas or said oxidative gas is formed;
    coating a coating layer on at least a second region of said surface of said conductive metal plate, said coating layer being on said conductive metal plate where said path for said fuel gas or said oxidative gas is formed;
  laminating said conductive coating membrane and said coating layer to said conductive metal plate having said adhesive layer; and
  heating and pressing said conductive coating membrane, said coating layer, and said conductive metal plate with said adhesive layer.

48. A method for producing a separator for an electrochemical fuel cell, said separator providing a path for a fuel gas or an oxidative gas to an electrode and functioning as a wall of a unit cell, said separator contacting said electrode, and said method comprising:
  coating a tight layer on a conductive metal plate, said tight layer being more easily softened at higher temperatures than said conductive metal plate; laminating a conductive coating membrane to said conductive metal plate with said tight layer; and
  heating and pressing said conductive coating membrane and said conductive metal plate with said tight layer.

49. A method for producing a separator for an electrochemical fuel cell, said separator providing a path for a fuel gas or an oxidative gas to an electrode and functioning as a wall of a unit cell, said separator contacting said electrode, and said method comprising:
  placing a membrane on a surface of a conductive metal plate, said tight coating membrane being able to adsorb a metallic ion melted from said conductive metal plate; and
  removing said membrane from at least a first region of said surface of said conductive metal plate where the separator contacts the electrode.

50. The method according to claim 49, wherein said placing the tight coating membrane comprises coating Schiff basic chelate resin or oxine chelate resin on said conductive metal plate.

51. The method according to claim 50 further comprising placing a conductive coating membrane on said conductive metal plate where said tight coating membrane is removed.

52. The method according to claim 49 further comprising placing a conductive coating membrane on said conductive metal plate where said tight coating membrane is removed.

* * * * *